United States Patent
Kim et al.

(10) Patent No.: US 11,978,858 B2
(45) Date of Patent: May 7, 2024

(54) NON-AQUEOUS ELECTROLYTE SOLUTION FOR LITHIUM SECONDARY BATTERY AND LITHIUM SECONDARY BATTERY COMPRISING SAME

(71) Applicant: LG Energy Solution, Ltd., Seoul (KR)

(72) Inventors: Haeun Kim, Daejeon (KR); Chul Haeng Lee, Daejeon (KR); Jeongwoo Oh, Daejeon (KR); Jinhyeon Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/277,481

(22) PCT Filed: Nov. 8, 2022

(86) PCT No.: PCT/KR2022/017454
§ 371 (c)(1),
(2) Date: Aug. 16, 2023

(87) PCT Pub. No.: WO2023/085731
PCT Pub. Date: May 19, 2023

(65) Prior Publication Data
US 2024/0113335 A1    Apr. 4, 2024

(30) Foreign Application Priority Data

Nov. 12, 2021 (KR) .......... 10-2021-0155296
Nov. 3, 2022 (KR) .......... 10-2022-0144896

(51) Int. Cl.
| | |
|---|---|
| *H01M 10/0567* | (2010.01) |
| *H01M 4/02* | (2006.01) |
| *H01M 4/525* | (2010.01) |
| *H01M 10/0525* | (2010.01) |
| *H01M 10/0568* | (2010.01) |
| *H01M 10/0569* | (2010.01) |

(52) U.S. Cl.
CPC ....... *H01M 10/0567* (2013.01); *H01M 4/525* (2013.01); *H01M 10/0525* (2013.01); *H01M 10/0568* (2013.01); *H01M 10/0569* (2013.01); *H01M 2004/028* (2013.01); *H01M 2300/0028* (2013.01)

(58) Field of Classification Search
CPC ......... H01M 10/0567; H01M 10/0525; H01M 10/0568; H01M 4/525; H01M 2004/028; H01M 2300/0028; H01M 2300/0025
See application file for complete search history.

(56) References Cited

U.S. PATENT DOCUMENTS

| | | |
|---|---|---|
| 2011/0250503 A1 | 10/2011 | Wilson et al. |
| 2020/0185773 A1 | 6/2020 | Oh et al. |
| 2021/0273263 A1 | 9/2021 | Kozel et al. |

FOREIGN PATENT DOCUMENTS

| | | |
|---|---|---|
| CN | 109273764 A | 1/2019 |
| CN | 110563764 A | 12/2019 |
| CN | 112531210 A | 3/2021 |
| EP | 4040560 A1 | 8/2022 |
| JP | 2011049153 A | 3/2011 |
| JP | 2021528806 A | 10/2021 |
| KR | 20110116019 A | 10/2011 |
| KR | 20150089712 A | 8/2015 |
| KR | 20190123136 A | 10/2019 |
| KR | 20200070802 A | 6/2020 |

OTHER PUBLICATIONS

International Search Report for Application No. PCT/KR2022/017454 dated Feb. 16, 2023, 3 pages.
Cyranski, M.K. et al., "Facts and artifacts about aromatic stability estimation", Elsevier, Tetrahedron, Jan. 2003, pp. 1657-1665, vol. 59, Issue 10.
Weidner, S. et al., "Organophosphorus Compounds, Part 168;1 1,3-Dipolar Cycloaddition Reactions of 1,3,5-Triphosphinines with Nitrile Oxides", Synthesis, Dec. 2004, pp. 241-248, No. 2.

*Primary Examiner* — Eugenia Wang
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution includes a lithium salt, an organic solvent, and a phosphoric acid-based additive represented by Formula 1 below, which improves the high temperature stability in a lithium secondary battery:

[Formula 1]

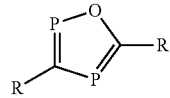

wherein R is described herein.

13 Claims, No Drawings

NON-AQUEOUS ELECTROLYTE SOLUTION FOR LITHIUM SECONDARY BATTERY AND LITHIUM SECONDARY BATTERY COMPRISING SAME

CROSS-REFERENCE TO RELATED APPLICATIONS

This application is a national phase entry under 35 U.S.C. 371 of International Application No. PCT/KR2022/017454, filed on Nov. 8, 2022, which claims priority from Korean Patent Application No. 10-2021-0155296 filed on Nov. 12, 2021, and Korean Patent Application No. 10-2022-0144896 filed on Nov. 3, 2022, all the disclosures of which are incorporated by reference herein.

TECHNICAL FIELD

The present disclosure relates to a non-aqueous electrolyte solution for a secondary battery capable of improving high-temperature storage characteristics and lifetime characteristics of a lithium secondary battery and a lithium secondary battery comprising the same.

BACKGROUND ART

Recently, as the application areas of lithium batteries are rapidly expanding not only to the supply of electric power to electronic devices such as electricity, electronics, communication, and computers, but also to the storage and supply of electric power to large-area devices such as automobiles and power storage devices, the demand for secondary batteries with high capacity, high power, and high stability is increasing.

A lithium secondary battery is generally manufactured by applying a mixture of a positive electrode active material made of transition metal oxide containing lithium or a negative electrode active material made of a carbon material or a silicon material capable of intercalating and de-intercalating lithium ions, and selectively, a binder and an electrically conductive material to a positive electrode current collector and a negative electrode current collector, respectively, to prepare a positive electrode and a negative electrode, laminating them on both sides of the separator to form an electrode current collector of a predetermined shape, and then inserting the electrode current collector and a non-aqueous electrolyte solution into the battery case. Here, the manufacturing method described above almost necessarily undergoes formation and aging processes in order to secure the performance of the battery.

The formation process is a step of activating the secondary battery by repeating charging and discharging after assembling the battery, wherein during the charging, the lithium ions from the lithium-containing transition metal oxide used as the positive electrode are moved to and inserted into the carbon material negative electrode active material used as the negative electrode. In this case, highly reactive lithium ions react with electrolytes to create compounds such as $Li_2CO_3$, $Li_2O$, LiOH, and LiF, and these compounds form a solid electrolyte interface (SEI) layer on the electrode surface. The formation of the SEI layer is an important factor since the SEI layer closely affects the lifetime and the maintenance of the capacity.

In recent years, especially in lithium secondary batteries for automobiles, high capacity, high power, and long lifetime characteristics have become important. When considering the positive electrode for high capacity, the positive electrode active material with high energy density but low stability is used, and thus, it is necessary to form the interface of the active material-electrolyte capable of stabilizing the positive electrode active material by protecting the surface of the positive electrode active material, and when considering the negative electrode, it has been reported that the surface species of the negative electrode are decomposed into the electrolyte solution and cause side reactions.

Specifically, the lithium ion battery currently uses a high-voltage and high-content nickel positive electrode in many cases to secure energy density, but as the voltage of the battery is increased, the electrochemical side reaction is increased on the surface of the positive electrode, and in the case of a nickel-cobalt-manganese (NCM) positive electrode, as the nickel content is increased, the instability of the structure can be increased, and the decomposition of the electrolyte solution can be promoted. In this case, the solvent is decomposed, and thus gas is generated or the resistance is increased, and HF is generated by the decomposition of the salt, thereby accelerating the leaching of the transition metal of the positive electrode active material, which is a metal oxide. In addition, the SEI layer formed on the surface of the active material is destroyed, causing problems such as an increase in the resistance of the battery and the deterioration of the lifetime, and when stored at high temperatures, the structure of the positive electrode and the SEI layer are gradually disintegrated by HF, PF5, etc. generated in the electrolyte solution, and additional side reactions may occur at the electrode.

Accordingly, in the relevant technical field, in order to solve the above problems, there is ongoing research to form a robust SEI layer capable of suppressing side reactions during storage at high temperatures, and as a part of this, research on additives in the electrolyte solution is also continued.

PRIOR ART DOCUMENTS

Patent Document (Patent Document 1) Korean Laid-open Patent Publication No. 10-2011-0116019

(Patent Document 2) Korean Laid-open Patent Publication No. 10-2015-0089712

SUMMARY

Technical Problem

The present disclosure is to solve the conventional problems, and thus the present disclosure is intended to provide an electrolyte solution for a lithium secondary battery capable of improving high-temperature storage characteristics and lifetime characteristics of a lithium secondary battery, by incorporating, as an additive to the non-aqueous electrolyte solution for the lithium secondary battery, a phosphoric acid-based additive having a specific structure with excellent conductivity capable of forming a film that can effectively suppress side reactions on the surfaces of the positive electrode and negative electrode that inevitably occur in the lithium secondary battery.

In addition, the present disclosure is intended to provide a lithium secondary battery with remarkably improved durability, that is, high-temperature storage characteristics and lifetime characteristics, by incorporating the non-aqueous electrolyte solution for the lithium secondary battery as described above, thereby causing a film to be formed on the surface of the positive electrode and negative electrode.

Technical Solution

In order to achieve the above objects, the present disclosure provides a non-aqueous electrolyte solution for a lithium secondary battery including a lithium salt, an organic solvent, and a phosphoric acid-based additive represented by Formula 1 below.

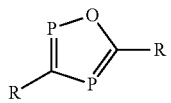

[Formula 1]

wherein,
R is a functional group that helps the formation of the film, and is a functional group having a chain or cyclic structure containing at least one element selected from H, C, N, O, F, P, S, or Si.

An embodiment of the present disclosure provides a non-aqueous electrolyte solution for a lithium secondary battery, wherein R in Formula 1 is the same as or different from each other, and may each independently be selected from the group consisting of hydrogen, halogen, hydroxy, cyano, nitro, substituted or unsubstituted amino, substituted or unsubstituted mercapto, substituted or unsubstituted carbamoyl, substituted or unsubstituted $C_{1-7}$ alkyl, substituted or unsubstituted $C_{1-7}$ halogenated alkyl, substituted or unsubstituted $C_{2-7}$ alkenyl, substituted or unsubstituted $C_{2-7}$ alkynyl, substituted or unsubstituted $C_{1-7}$ alkoxy, substituted or unsubstituted $C_{1-4}$ alkoxy-$C_{1-4}$ alkoxy, substituted or unsubstituted $C_{6-10}$ aryl-$C_{1-4}$ alkoxy, substituted or unsubstituted $C_{2-7}$ alkenyloxy, substituted or unsubstituted $C_{2-7}$ alkynyloxy, substituted or unsubstituted $C_{3-7}$ cycloalkyl, substituted or unsubstituted $C_{3-7}$ cycloalkenyl, substituted or unsubstituted 3-7 membered heterocycloalkyl, substituted or unsubstituted $C_{3-7}$ cycloalkyloxy, substituted or unsubstituted $C_{3-7}$ cycloalkenyloxy, substituted or unsubstituted 3-7 membered heterocycloalkyloxy, substituted or unsubstituted $C_{6-10}$ aryl, substituted or unsubstituted 5-10 membered heteroaryl, substituted or unsubstituted $C_{6-10}$ aryloxy, substituted or unsubstituted 5-10 membered heteroaryloxy, substituted or unsubstituted mono- or di-$C_{1-4}$ alkylamino, substituted or unsubstituted mono- or di-$C_{6-10}$ arylamino, substituted or unsubstituted $C_{1-4}$ alkylcarbonylamino, substituted or unsubstituted $C_{1-4}$ alkylcarbonyl, substituted or unsubstituted $C_{1-4}$ alkoxycarbonyl, substituted or unsubstituted $C_{2-4}$ alkenyloxycarbonyl, and substituted or unsubstituted $C_{2-4}$ alkynyloxycarbonyl.

An embodiment of the present disclosure provides a non-aqueous electrolyte solution for a lithium secondary battery, wherein R in Formula 1 is the same as or different from each other, and may each independently be selected from the group consisting of hydrogen, halogen, hydroxy, cyano, nitro, substituted or unsubstituted amino, substituted or unsubstituted $C_{1-4}$ alkyl, substituted or unsubstituted $C_{1-4}$ halogenated alkyl, substituted or unsubstituted $C_{2-4}$ alkenyl, and substituted or unsubstituted $C_{2-4}$ alkynyl, substituted or unsubstituted $C_{1-4}$ alkoxy, substituted or unsubstituted mono- or di-$C_{1-4}$ alkylamino, substituted or unsubstituted $C_{1-4}$ alkylcarbonyl, and substituted or unsubstituted $C_{1-4}$ alkoxycarbonyl.

An embodiment of the present disclosure provides a non-aqueous electrolyte solution for a lithium secondary battery, wherein R in Formula 1 is the same as or different from each other, and may each independently be selected from the group consisting of hydrogen, halogen, substituted or unsubstituted $C_{1-4}$ alkyl, substituted or unsubstituted $C_{1-4}$ halogenated alkyl and substituted or unsubstituted $C_{2-4}$ alkenyl.

An embodiment of the present disclosure provides a non-aqueous electrolyte solution for a lithium secondary battery, wherein the phosphoric acid-based additive may be comprised in an amount of 0.01% by weight to 10% by weight based on the total weight of the electrolyte solution.

An embodiment of the present disclosure provides a non-aqueous electrolyte solution for a lithium secondary battery, wherein the lithium salt is selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiSO$_3$F, LiN(SO$_2$F)$_2$, LiN(SO$_2$CF$_2$CF$_3$)$_2$, and LiN(SO$_2$CF$_3$)$_2$.

An embodiment of the present disclosure provides a non-aqueous electrolyte solution for a lithium secondary battery, wherein the concentration of the lithium salt is 0.1 M to 3 M.

An embodiment of the present disclosure provides a non-aqueous electrolyte solution for a lithium secondary battery, wherein the organic solvent includes at least one selected from an ether, an ester, an amide, a linear carbonate, or a cyclic carbonate.

An embodiment of the present disclosure provides a lithium secondary battery comprising a positive electrode, a negative electrode, a separator interposed between the positive electrode and the negative electrode, and the non-aqueous electrolyte solution for the lithium secondary battery as described above.

An embodiment of the present disclosure provides a lithium secondary battery in which the positive electrode has a layered structure made of a positive electrode active material, and a lithium composite transition metal oxide having a nickel content of 60 atm % or more among all transition metals is comprised in the positive electrode active material.

Advantageous Effects

The non-aqueous electrolyte solution for the lithium secondary battery according to the present disclosure exhibits an effect of suppressing the decomposition reaction of the non-aqueous electrolyte solution itself, by comprising a phosphoric acid-based additive with a specific structure, as well as effectively suppressing side reactions on the surfaces of the positive electrode and the negative electrode that inevitably occur in the lithium secondary battery, by forming a film on the surfaces of the positive electrode and the negative electrode.

As a result, the present disclosure shows the effect of improving durability, that is, high-temperature storage characteristics and lifetime characteristics of a lithium secondary battery including the non-aqueous electrolyte solution for the lithium secondary battery.

DETAILED DESCRIPTION

The embodiments provided according to the present disclosure can all be achieved by the following description. It should be understood that the following description describes preferred embodiments of the present disclosure, and that the present disclosure is not necessarily limited thereto.

As used herein, the term "$C_{n1-n2}$" means that the number of carbon atoms in the functional group is n1 to n2.

As used herein, the term "alkyl" refers to a straight-chain or branched-chain saturated hydrocarbon containing one radical, wherein one radical determines the binding site as a functional group, and the binding site is not particularly limited. Examples of the term "alkyl" comprise, but are not limited to, methyl, ethyl, n-propyl, i-propyl, n-butyl, i-butyl, t-butyl, n-pentyl, i-pentyl and hexyl, and the like.

As used herein, the term "alkylene" refers to a straight-chain or branched-chain saturated hydrocarbon containing two radicals, wherein each of the two radicals determines the binding site as a functional group, and the binding site is not particularly limited. Examples of the term "alkylene" comprise, but are not necessarily limited to, methylene and ethylene, and the like.

As used herein, the term "alkenyl" refers to a straight or branched chain hydrocarbon containing one radical and having at least one carbon-carbon double bond, wherein one radical determines the binding site as a functional group, and the binding site is not particularly limited. Examples of the term "alkenyl" comprise, but are not necessarily limited to, ethenyl and propenyl, and the like.

As used herein, the term "alkynyl" refers to a straight or branched chain hydrocarbon containing one radical and having at least one carbon-carbon triple bond, wherein one radical determines the binding site as a functional group, and the binding site is not particularly limited. Examples of the term "alkynyl" comprise, but are not necessarily limited to, acetylenyl, 1-propynyl and the like.

As used herein, the term "halogen" means fluorine (F), chlorine (Cl), bromine (Br) or iodine (I).

As used herein, the term "halogenated alkyl" means that one or more hydrogens in an alkyl have been replaced with a halogen.

As used herein, the term "cycloalkyl" refers to a saturated hydrocarbon containing one radical and having one or more rings, wherein one radical determines the binding site as a functional group, and the binding site is not particularly limited.

Examples of the term "cycloalkyl" comprise, but are not necessarily limited to, cyclopentyl, cyclohexyl, and cycloheptyl, and the like.

As used herein, the term "cycloalkenyl" refers to a hydrocarbon containing one radical, having one or more rings, and having one or more carbon-carbon double bonds in the ring, wherein one radical determines the binding site as a functional group, and the binding site is not particularly limited. Examples of the term "cycloalkenyl" comprise, but are not necessarily limited to, cyclopentenyl, cyclohexenyl, and cycloheptenyl, and the like.

As used herein, the term "$n_1$-$n_2$ member" means that the sum of the number of carbon atoms and the number of hetero elements is $n_1$ to $n_2$. A hetero element broadly means an element other than carbon, but in this specification, the term "$n_1$-$n_2$ member" is used in front of a cyclic functional group to mean the number of elements constituting the ring.

As used herein, the term "heterocycloalkyl" refers to a saturated hydrocarbon containing one radical, having one or more rings, and having one or more heteroatoms in the ring, wherein one radical determines the binding site as a functional group, and the binding site is not particularly limited. The hetero element may form a ring, and exemplarily comprises O, N, S, P, or the like. Examples of the term "heterocycloalkyl" comprise, but are not necessarily limited to, piperidinyl and tetrahydropyranyl.

As used herein, the term "aryl" refers to an aromatic cyclic hydrocarbon containing one radical and having one or more rings, wherein one radical determines the binding site as a functional group, and the binding site is not particularly limited. Examples of the term "aryl" comprise, but are not necessarily limited to, phenyl and naphthyl, and the like.

As used herein, the term "arylene" refers to an aromatic cyclic hydrocarbon containing two radicals and having one or more rings, wherein each of the two radicals determines the binding site as a functional group, and the binding site is not particularly limited. Examples of the term "arylene" comprise, but are not necessarily limited to, phenylene, naphthylene, and the like. The aforementioned "alkylene" and "arylene" may be combined and used in the form of, for example, methylene-phenylene or the like.

As used herein, the term "heteroaryl" refers to an aromatic cyclic hydrocarbon containing one radical, having one or more rings, and having one or more heteroatoms in the ring, wherein one radical determines the binding site as a functional group, and the binding site is not particularly limited. The hetero element may form a ring, and exemplarily comprises O, N, S, or the like. Examples of the term "heteroaryl" comprise, but are not necessarily limited to, pyrrolyl and furanyl, and the like.

As used herein, the term "alkoxy" refers to a functional group in the form of —OR$_a$ wherein R$_a$ is an alkyl as described above. Examples of the term "alkoxy" comprises, but are not necessarily limited to, methoxy, difluoromethoxy, trifluoromethoxy, ethoxy, n-propoxy, iso-propoxy, n-butoxy, t-butoxy and the like.

As used herein, the term "alkoxy-alkoxy" refers to a functional group in the form of —OR$_a$—OR$_b$ wherein R$_a$ is alkylene and R$_b$ is alkyl as described above. Examples of the term "alkoxy-alkoxy" comprise, but are not necessarily limited to, methoxy-methoxy, methoxy-ethoxy, ethoxy-ethoxy and the like.

As used herein, the term "aryl-alkoxy" refers to a functional group in the form of —OR$_a$—R$_b$ wherein R$_a$ is alkylene and RID is aryl as described above. Examples of the term "aryl-alkoxy" comprise, but are not necessarily limited to, phenyl-methoxy, phenyl-ethoxy, and the like.

As used herein, the term "alkenyloxy" refers to a functional group in the form of —OR$_a$ wherein R$_a$ is alkenyl as described above. Examples of the term "alkenyloxy" comprise, but are not necessarily limited to, ethenyloxy, propenyloxy, and the like.

As used herein, the term "alkynyloxy" refers to a functional group in the form of —OR$_a$ wherein R$_a$ is alkynyl as described above. Examples of the term "alkynyloxy" comprise, but are not necessarily limited to, ethynyloxy, propynyloxy, and the like.

As used herein, the term "cycloalkyloxy" refers to a functional group in the form of —OR$_a$ wherein R$_a$ is cycloalkyl as described above. Examples of the term "cycloalkyloxy" comprise, but are not necessarily limited to, cyclopentyloxy, cyclohexyloxy and the like.

As used herein, the term "cycloalkenyloxy" refers to a functional group in the form of —OR$_a$ wherein R$_a$ is cycloalkenyl as described above. Examples of the term "cycloalkenyloxy" comprise, but are not necessarily limited to, cyclopentenyloxy, cyclohexenyloxy and the like.

As used herein, the term "heterocycloalkyloxy" refers to a functional group in the form of —OR$_a$ wherein R$_a$ is heterocycloalkyl as described above. Examples of the term "heterocycloalkyloxy" comprise, but are not necessarily limited to, piperidinyloxy, tetrahydropyranyloxy and the like.

As used herein, the term "aryloxy" refers to a functional group in the form of —$OR_a$ wherein $R_a$ is aryl as described above. Examples of the term "aryloxy" comprises, but are not necessarily limited to, phenyloxy, naphthyloxy, and the like.

As used herein, the term "heteroaryloxy" refers to a functional group in the form of —$OR_a$ wherein $R_a$ is heteroaryl as described above. Examples of the term "heteroaryloxy" comprise, but are not necessarily limited to, pyrrolyloxy, furanyloxy, and the like. As used herein, the term "mercapto" refers to a functional group in the form of —SH.

As used herein, the term "hydroxy" refers to a functional group in the form of —OH.

As used herein, the term "amino" refers to a functional group in the form of —$NH_2$. One or more hydrogens in the amino as described above may be substituted with an alkyl, cycloalkyl, heterocycloalkyl, aryl, heteroaryl or the like as described above. For example, if one hydrogen in the amino is substituted with an alkyl, it is termed a mono-alkylamino, and if two hydrogens in the amino are substituted with an alkyl, it is termed a di-alkylamino.

As used herein, the term "carbonylamino" refers to a functional group in the form of —$NHC(O)R_a$ wherein $R_a$ is an alkyl, cycloalkyl, heterocycloalkyl, aryl, heteroaryl or the like as described above. Here, hydrogen may also be substituted with an alkyl or the like.

As used herein, the term "cyano" refers to a functional group in the form of —CN.

As used herein, the term "carbamoyl" refers to a functional group in the form of —$C(O)NH_2$. Here, one or more hydrogens may also be substituted with alkyl or the like.

As used herein, the term "nitro" refers to a functional group in the form of —$NO_2$.

As used herein, the term "carbonyl" refers to a functional group in the form of —$C(O)R_a$ wherein $R_a$ is alkyl, cycloalkyl, heterocycloalkyl, aryl, heteroaryl, alkoxy, alkenyloxy, alkynyloxy and the like as described above. For example, if $R_a$ is alkyl, it is also termed "alkylcarbonyl", and if $R_a$ is alkoxy, it is also termed "alkoxycarbonyl." In addition, if $R_a$ is alkenyloxy, it is also termed "alkenyloxycarbonyl", and if $R_a$ is alkynyloxy, it is also termed "alkynyloxycarbonyl."

As used herein, the term "substituted or unsubstituted" means that the corresponding functional group exists in a substituted or unsubstituted state, and the term "substituted" means that a hydrogen atom bonded to a carbon atom of a compound is changed to another substituent, and the position to be substituted is not limited as long as the position where the hydrogen atom can be substituted, that is, the position where the substituent can be substituted, and when substituted with two or more substituents, the two or more substituents may be the same as or different from each other.

The substituent may be used without particular limitation as long as it is a substituent commonly used in the art. Examples of the substituent may comprise halogen, hydroxy, cyano, nitro, amino, $C_{1-4}$ alkyl, $C_{1-4}$ halogenated alkyl, $C_{1-4}$ alkoxy, $C_{1-4}$ alkoxy-$C_{1-4}$ alkoxy, $C_{3-7}$ cycloalkyl, $C_{3-7}$ cycloalkenyl, $C_{3-7}$ cycloalkyloxy, 3-7 membered heterocycloalkyl, $C_{6-10}$ aryl, 5-10 membered heteroaryl, mono- or di-$C_{1-4}$ alkylamino, mono- or di-$C_{6-10}$ arylamino, carbonylamino, $C_{1-4}$ alkylcarbonyl, $C_{1-4}$ alkoxycarbonyl, $C_{2-4}$ alkenyloxycarbonyl, $C_{2-4}$ alkynyloxycarbonyl, and the like.

In the present disclosure, "when no substituent is shown in the formula or structure of the compound" means that a hydrogen atom is bonded to a carbon atom. However, since deuterium ($^2H$) is an isotope of hydrogen, some hydrogen atoms may be deuterium.

The present disclosure provides a non-aqueous electrolyte solution for a lithium secondary battery including a lithium salt, an organic solvent, and a phosphoric acid-based additive represented by Formula 1 below.

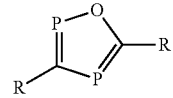

[Formula 1]

wherein,

R is a functional group that helps the formation of the film, and is a functional group having a chain or cyclic structure containing at least one element selected from H, C, N, O, F, P, S, or Si.

In an embodiment of the present disclosure, R in Formula 1 is the same as or different from each other, and may each independently be selected from the group consisting of hydrogen, halogen, hydroxy, cyano, nitro, substituted or unsubstituted amino, substituted or unsubstituted mercapto, substituted or unsubstituted carbamoyl, substituted or unsubstituted $C_{1-7}$ alkyl, substituted or unsubstituted $C_{1-7}$ halogenated alkyl, substituted or unsubstituted $C_{2-7}$ alkenyl, substituted or unsubstituted $C_{2-7}$ alkynyl, substituted or unsubstituted $C_{1-7}$ alkoxy, substituted or unsubstituted $C_{1-4}$ alkoxy-$C_{1-4}$ alkoxy, substituted or unsubstituted $C_{6-10}$ aryl-$C_{1-4}$ alkoxy, substituted or unsubstituted $C_{2-7}$ alkenyloxy, substituted or unsubstituted $C_{2-7}$ alkynyloxy, substituted or unsubstituted $C_{3-7}$ cycloalkyl, substituted or unsubstituted $C_{3-7}$ cycloalkenyl, substituted or unsubstituted 3-7 membered heterocycloalkyl, substituted or unsubstituted $C_{3-7}$ cycloalkyloxy, substituted or unsubstituted $C_{3-7}$ cycloalkenyloxy, substituted or unsubstituted 3-7 membered heterocycloalkyloxy, substituted or unsubstituted $C_{6-10}$ aryl, substituted or unsubstituted 5-10 membered heteroaryl, substituted or unsubstituted $C_{6-10}$ aryloxy, substituted or unsubstituted 5-10 membered heteroaryloxy, substituted or unsubstituted mono- or di-$C_{1-4}$ alkylamino, substituted or unsubstituted mono- or di-$C_{6}$-arylamino, substituted or unsubstituted $C_{1-4}$ alkylcarbonylamino, substituted or unsubstituted $C_{1-4}$ alkylcarbonyl, substituted or unsubstituted $C_{1-4}$ alkoxycarbonyl, substituted or unsubstituted $C_{2-4}$ alkenyloxycarbonyl, and substituted or unsubstituted $C_{2-4}$ alkynyloxycarbonyl.

In another embodiment of the present disclosure, R in Formula 1 is the same as or different from each other, and may each independently be selected from the group consisting of hydrogen, halogen, hydroxy, cyano, nitro, substituted or unsubstituted amino, substituted or unsubstituted $C_{1-4}$ alkyl, substituted or unsubstituted $C_{1-4}$ halogenated alkyl, substituted or unsubstituted $C_{2-4}$ alkenyl, and substituted or unsubstituted $C_{2-4}$ alkynyl, substituted or unsubstituted $C_{1-4}$ alkoxy, substituted or unsubstituted mono- or di-$C_{1-4}$ alkylamino, substituted or unsubstituted $C_{1-4}$ alkylcarbonyl, and substituted or unsubstituted $C_{1-4}$ alkoxycarbonyl.

In still another embodiment of the present disclosure, R in Formula 1 is the same as or different from each other, and may each independently be selected from the group consisting of hydrogen, halogen, substituted or unsubstituted $C_{1-4}$ alkyl, substituted or unsubstituted $C_{1-4}$ halogenated alkyl, and substituted or unsubstituted $C_{2-4}$ alkenyl.

In an embodiment of the present disclosure, the phosphoric acid-based additive may be comprised in an amount of 0.01% by weight to 10% by weight based on the total weight of the electrolyte solution. Specifically, the phosphoric acid-based additive may be comprised in an amount of 0.01% by weight or more, 0.05% by weight or more, 0.1% by weight or more, 0.5% by weight or more, 1% by weight or more, 2% by weight or more, and 10% by weight or less, 9% by weight or less, 8% by weight or less, 7% by weight or less, 6% by weight or less, 5% by weight or less, 4% by weight or less, 3% by weight or less, and may be comprised in an amount of 0.01% by weight to 10% by weight, 0.1% by weight to 5% by weight, 0.5% by weight to 3% by weight, 1% by weight to 3% by weight, based on the total weight of the electrolyte solution. If the content of the phosphoric acid-based additive is less than the above range, when storing at high temperature or operating the battery for a long time, the addition effect is not shown, for example, the suppression of the swelling phenomenon of the battery and the improvement of the capacity retention rate are insignificant and so on, and the improvement effect of improving the resistance increase rate of the lithium secondary battery is insignificant. If the content of the phosphoric acid-based additive exceeds the above range, there is a problem that the characteristics of the lithium secondary battery are rather deteriorated, for example, the resistance is excessively increased, thereby resulting in rapid deterioration of the lifetime and so on. Therefore, it is preferable that the content of the phosphoric acid-based additive satisfies the above range.

In an embodiment of the present disclosure, the non-aqueous electrolyte solution for the lithium secondary battery may further comprise an additive selected from lithium difluorooxalatoborate (LiDFOB), lithium bisoxalatoborate (LiB($C_2O_4$)$_2$, LiBOB), lithium tetrafluoroborate (LiBF$_4$), lithium difluorooxalatophosphate (LiDFOP), lithium tetrafluorooxalatophosphate (LiTFOP), lithium difluorophosphate (LiPO$_2$F$_2$), fluoroethylene carbonate (FEC), vinylene carbonate (VC), vinyl ethylene carbonate (VEC), divinyl sulfone, ethylene sulfite, ethylene sulfate, propylene sulfite, diallyl sulfonate, ethane sultone, propane sulton (PS), butane sulton, ethene sultone, butene sultone or propene sultone (PRS).

In an embodiment of the present disclosure, the non-aqueous electrolyte solution for the lithium secondary battery may contain a lithium salt, and the lithium salt may comprise at least one selected from LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiSO$_3$F, LiFSI(Lithium bis(fluorosulfonyl)imide, LiN(SO$_2$F)$_2$), LiBETI(lithium bisperfluoroethanesulfonimide, LiN(SO$_2$CF$_2$CF$_3$)$_2$, or LiTFSI(lithium (bis)trifluoromethanesulfonimide, LiN(SO$_2$CF$_3$)$_2$).

In an embodiment of the present disclosure, the concentration of the lithium salt may be 0.1 M to 3.0 M, preferably 0.5 M to 2.5 M, and more preferably 0.8 M to 2.0 M. Specifically, the concentration of the lithium salt may be 0.1M or more, 0.2M or more, 0.3M or more, 0.4M or more, 0.5M or more, 0.6M or more, 0.7M or more, 0.8M or more, 0.9M or more, or 1.0M or more, and 3.0M or less, 2.5M or less, 2.0M or less, or 1.5M or less. If the concentration of lithium salt is less than 0.1M, the conductivity of the electrolyte solution is lowered and the performance of the electrolyte solution is deteriorated. If the concentration of lithium salt exceeds 3.0 M, there is a problem in that the viscosity of the electrolyte solution is increased, and thus the mobility of lithium ions is decreased. Therefore, it is preferable that the concentration of lithium salt satisfies the above range. The lithium salt serves as a source of lithium ions in the battery, thereby enabling a basic operation of the lithium secondary battery.

In another embodiment of the present disclosure, the non-aqueous electrolyte solution for the lithium secondary battery may be used by mixing LiPF$_6$ and other types of lithium salts other than LiPF$_6$.

The other type of lithium salt other than LiPF$_6$ may be one or more selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiSO$_3$F, LiFSI(Lithium bis(fluorosulfonyl)imide, LiN(SO$_2$F)$_2$), LiBETI(lithium bisperfluoroethanesulfonimide, LiN(SO$_2$CF$_2$CF$_3$)$_2$, and LiTFSI (lithium (bis)trifluoromethanesulfonimide, LiN(SO$_2$CF$_3$)$_2$).

In addition, the molar ratio of LiPF$_6$ and other type of lithium salt other than LiPF$_6$ is 1:1 to 10:1, preferably 4:1 to 10:1, and more preferably 6:1 to 10:1. LiPF$_6$ and a lithium salt other than LiPF$_6$ satisfy the above molar ratio, thereby stably forming a film capable of suppressing corrosion of the current collector, even while suppressing side reactions of the electrolyte solution.

In an embodiment of the present disclosure, the non-aqueous electrolyte solution for the lithium secondary battery of the present disclosure may contain an organic solvent, and the organic solvent is a solvent commonly used in the lithium secondary battery, and for example, an ether compound, an ester (acetate, propionate) compound, an amide compound, a linear carbonate, or a cyclic carbonate compound may be used alone or in a mixture of two or more thereof.

Among the compounds listed above, a mixture of linear carbonate and cyclic carbonate may be preferably used as the organic solvent. As an organic solvent, when a mixture of linear carbonate and cyclic carbonate is used, dissociation and movement of lithium salt can be facilitated. In this case, the cyclic carbonate-based compound and the linear carbonate-based compound are mixed in a volume ratio of 1:9 to 6:4, preferably 1:9 to 4:6, and more preferably 2:8 to 4:6.

Meanwhile, the linear carbonate compound may comprise, as a specific example, one compound selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC) or a mixture of at least two or more thereof, but is not limited thereto.

In addition, the cyclic carbonate compound may comprise, as a specific example, one compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof or a mixture of at least two or more thereof.

In an embodiment of the present disclosure, the lithium secondary battery comprising the non-aqueous electrolyte solution for the lithium secondary battery may have an operating voltage of 4.0 V or higher, preferably an operating voltage of 4.1V or higher, and more preferably an operating voltage of 4.2V or higher. If the operating voltage of the lithium secondary battery is less than 4.0V, the difference according to the addition of the phosphoric acid-based additive of the present disclosure is not large. However, in a lithium secondary battery having an operating voltage of 4.0V or higher, it exhibits the effect of rapidly increasing high temperature storage stability and capacity characteristics depending on the addition of the additive.

Lithium Secondary Battery

Hereinafter, a lithium secondary battery according to the present disclosure will be described.

The lithium secondary battery of the present disclosure comprises a positive electrode, a negative electrode, a separator, and a non-aqueous electrolyte solution for a lithium secondary battery. More specifically, the lithium secondary battery comprises at least one positive electrode, at least one negative electrode, and a separator that may be selectively interposed between the positive electrode and the negative electrode, and the non-aqueous electrolyte solution for the lithium secondary battery as described above. At this time, since the non-aqueous electrolyte solution for the lithium secondary battery is the same as that described above, a detailed description thereof will be omitted.

(1) Positive Electrode

The positive electrode may be prepared by coating a slurry for positive electrode active material including a positive electrode active material, a binder for an electrode, an electrically conductive material for an electrode, and a solvent on a positive electrode current collector. In addition, the positive electrode may have a layer structure with a positive electrode active material.

The positive electrode current collector is not particularly limited as long as it has high electrical conductivity without causing chemical changes in the relevant battery. For example, stainless steel, aluminum, nickel, titanium, sintered carbon, or aluminum or stainless steel whose surface is treated with carbon, nickel, titanium, silver or the like may be used. In this case, the positive electrode current collector can have minute irregularities formed on its surface to enhance the bonding force with the positive electrode active material, and may be formed in various forms such as film, sheet, foil, net, porous body, foam, nonwoven fabric or the like.

The positive electrode active material is a compound capable of reversibly intercalating and de-intercalating lithium, and specifically, may comprise lithium composite metal oxide comprising lithium and at least one metal such as cobalt, manganese, nickel or aluminum. More specifically, the lithium composite metal oxide may be lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (wherein $0<Y1<1$), $LiMn_{2-z1}Ni_{z1}O_4$ (wherein $0<Z1<2$) etc.), lithium-nickel-cobalt-based oxide (e.g., $LiNi_{1-Y2}Co_{Y2}O_2$ (wherein $0<Y2<1$) etc.), lithium-manganese-cobalt-based oxide (e.g., $LiCo_{1-Y3}Mn_{Y3}O_2$ (wherein $0<Y3<1$), $LiMn_{2-z2}Co_{z2}O_4$ (wherein $0<Z2<2$) etc.), lithium-nickel-manganese-cobalt-based oxide(e.g., $Li(Ni_{p1}Co_{q1}Mn_{r1})O_2$ (wherein $0<p1<1$, $0<q1<1$, $0<r1<1$, $p1+q1+r1=1$) or $Li(Ni_{p2}Co_{q2}Mn_{r2})O_4$ (wherein $0<p2<2$, $0<q2<2$, $0<r2<2$, $p2+q2+r2=2$) etc.), or lithium-nickel-cobalt-transition metal(M) oxide(e.g., $Li(Ni_{p3}Co_{q3}Mn_{r3}M_{s1})O_2$ (wherein M is selected from the group consisting of Al, Fe, V, Cr, Ti, Ta, Mg and Mo, and p3, q3, r3 and s1 is the atomic fraction of each independent element, wherein $0<p3<1$, $0<q3<1$, $0<r3<1$, $0<s1<1$, and $p3+q3+r3+s1=1$) etc.), and any one or two or more of these compounds may be comprised.

Among these, when considering that the capacity characteristics and stability of the battery can be increased, the lithium composite metal oxide may be $LiCoO_2$, $LiMnO_2$, $LiNiO_2$, lithium nickel manganese cobalt oxide(e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$ etc.), or lithium nickel cobalt aluminum oxide(e.g., $LiNi_{0.8}Co_{0.15}Al_{0.05}O_2$ etc.), and when considering the remarkable improvement effect according to the control of the type and content ratio of elemental elements forming lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or $Li(Ni_{0.85}Mn_{0.08}Co_{0.05}Al_{0.02})O_2$, and any one or a mixture of two or more of these may be used.

In addition, the positive electrode active material may include a lithium composite transition metal oxide having a nickel content of 60 atm % or more in total transition metals. For example, it may be 60 atm % or more, 65 atm % or more, 70 atm % or more, 75 atm % or more, 80 atm % or more, 85 atm % or more, or 90 atm % or more.

The binder for the electrode is a component that assists in bonding of a positive electrode active material and an electrically conductive material, and bonding to a current collector. Specifically, the binder may comprise polyvinylidene fluoride, polyvinyl alcohol, carboxymethylcellulose (CMC), starch, hydroxypropyl cellulose, regenerated cellulose, polyvinyl pyrrolidone, tetrafluoroethylene, polyethylene (PE), polypropylene, ethylene-propylene-diene terpolymer (EPDM), sulfonated-EPDM, styrene-butadiene rubber, fluorine rubber, or various copolymers.

The electrically conductive material is a component for further improving the electrical conductivity of the positive electrode active material. The electrically conductive material is not particularly limited as long as it has electrical conductivity without causing chemical changes in the battery, and for example, graphite; carbon-based materials such as carbon black, acetylene black, Ketjen black, channel black, furnace black, lamp black, thermal black and carbon nanotube; electrically conductive fibers such as carbon fibers and metal fibers; metal powders such as carbon fluoride, aluminum, and nickel powder; electrically conductive whiskers such as zinc oxide and potassium titanate; electrically conductive metal oxides such as titanium oxide; electrically conductive materials such as polyphenylene derivatives can be used. Specific examples of commercially available electrically-conductive materials may comprise acetylene black series of products from Chevron Chemical Company or Denka black (Denka Singapore Private Limited), products from Gulf Oil Company, Ketjen black, EC series (products from Armak Company), Vulcan XC-72 (products from Cabot Company) or Super P (products from Timcal Company).

The solvent may comprise an organic solvent such as N-methyl-2-pyrrolidone (NMP), and may be used in an amount to achieve a desirable viscosity when the positive electrode active material, and optionally the binder for the positive electrode, the electrically conductive material for the positive electrode and the like are comprised.

(2) Negative Electrode

In addition, the negative electrode can be manufactured by coating a slurry for negative electrode active material comprising a negative electrode active material, a binder for an electrode, an electrode electrically conductive material, a solvent and the like, on a negative electrode current collector. Meanwhile, as the negative electrode, the metal negative electrode current collector itself can be used as an electrode.

The negative electrode current collector is not particularly limited as long as it has high electrical conductivity without causing chemical changes in the battery, and for example, copper, stainless steel, aluminum, nickel, titanium, sintered carbon, copper, or stainless steel whose surface is treated with carbon, nickel, titanium, silver or the like, or aluminum-cadmium alloy or the like may be used. Also, as in the positive electrode current collector, the negative electrode current collector can have minute irregularities formed on its surface to enhance the bonding force with the negative electrode active material, and may be used in various forms such as film, sheet, foil, net, porous body, foam, nonwoven fabric or the like.

The negative electrode active material may be at least one negative electrode active material selected from the group consisting of natural graphite, artificial graphite, carbonaceous materials; lithium-containing titanium composite oxide (LTO), Si, Sn, Li, Zn, Mg, Cd, Ce, Ni, or Fe metals (Me); alloys composed of the above metals (Me); oxide (MeOx) of the above metals (Me); and a composite of the above metals (Me) and carbon.

Since the contents of the binder for the electrode, the electrically conductive material for the electrode, and the solvent are the same as those described above, a detailed description thereof will be omitted.

(3) Separator

As the separator, a conventional porous polymer film conventionally used as a separator, for example, a porous polymer film made of a polyolefin-based polymer such as ethylene homopolymer, propylene homopolymer, ethylene/butene copolymer, ethylene/hexene copolymer, and ethylene/methacrylate copolymer may be used alone or they may be laminated and used, or a conventional porous nonwoven fabric, for example, a non-woven fabric made of high melting glass fibers, polyethylene terephthalate fibers, or the like may be used, but is not limited thereto.

Hereinafter, a preferred example is presented to help the understand the present disclosure. However, the following examples are provided for easier understanding of the present disclosure, and the present disclosure is not limited thereto.

Examples

Example 1

After preparing $Li(Ni_{0.85}Mn_{0.08}Co_{0.05}Al_{0.02})O_2$ as a positive electrode active material, carbon black as an electrically conductive material, and PVDF as a binder in a weight ratio of 97.6:1.2:1.2 (positive electrode active material:electrically conductive material:binder), they were mixed in an N-methylpyrrolidone solvent to prepare a slurry for a positive electrode active material. The prepared slurry for the positive electrode active material is applied to one side of an aluminum current collector (15 μm) (loading amount: 0.40~0.55 mg/25 cm$^2$), and then dried at 130° C.; for 20 minutes or more, and it was rolled once or twice so that the porosity was 24%, thereby preparing a positive electrode.

As a negative electrode, an electrode formed by mixing natural graphite and artificial graphite at a ratio of 2:8 was used, and a separator of porous polyethylene was interposed between the positive electrode and the negative electrode to prepare an electrode assembly. The electrode assembly was placed inside the battery case, and then, electrolyte was injected into the case to prepare a lithium secondary battery. In this case, the electrolyte solution was prepared by dissolving 1M concentration of lithium hexafluorophosphate ($LiPF_6$) in an organic solvent composed of ethylene carbonate/ethylmethyl carbonate (EC/EMC mixing volume ratio=3/7), adding 0.5% by weight of vinylene carbonate (VC), 0.5% by weight of propane sultone (PS) and 1% by weight of ethylene sulfate (ESa), and additionally adding a phosphoric acid-based additive, in which R in Formula 1 is all $CF_3$, in an amount of 0.5% by weight.

Example 2

A lithium secondary battery was manufactured in the same manner as in Example 1, except that 1% by weight of the phosphoric acid-based additive was added in the electrolyte solution.

Example 3

A lithium secondary battery was manufactured in the same manner as in Example 1, except that 3% by weight of the phosphoric acid-based additive was added in the electrolyte solution.

Example 4

A lithium secondary battery was manufactured in the same manner as in Example 2, except that a phosphoric acid-based additive in which R in Formula 1 is all F was used in the electrolyte solution.

Example 5

A lithium secondary battery was manufactured in the same manner as in Example 1, except that 5% by weight of the phosphoric acid-based additive was added in the electrolyte solution.

Comparative Example 1

A lithium secondary battery was manufactured in the same way as in Example 1, except that the phosphoric acid-based additive was not added in the electrolyte solution.

Experimental Example

Experimental Example: Measurement of High Temperature Performance

The lithium secondary batteries manufactured in Examples 1 to 5 and Comparative Example 1 were fully charged up to SOC 100% (2000 mAh) under a voltage condition of 4.2 V. Thereafter, after high temperature storage for 8 weeks in a constant temperature chamber at 60° C., capacity retention rate (%), resistance increase rate (%) and volume increase rate (%) were measured, and the results are shown in Table 1 below.

TABLE 1

| | Capacity retention rate (%) | Resistance increase rate (%) | Volume increase rate (%) |
|---|---|---|---|
| Example 1 (R=CF$_3$, 0.5% by weight) | 78.8 | 21.8 | 16.0 |
| Example 2 (R=CF$_3$, 1% by weight) | 84.9 | 14.0 | 11.2 |
| Example 3 (R=CF$_3$, 3% by weight) | 89.1 | 10.3 | 9.6 |
| Example 4 (R=F, 1% by weight) | 82.2 | 19.5 | 8.9 |

TABLE 1-continued

| | Capacity retention rate (%) | Resistance increase rate (%) | Volume increase rate (%) |
|---|---|---|---|
| Example 5 (R=CF$_3$, 5% by weight) | 71.0 | 41.5 | 15.3 |
| Comparative Example 1 (no addition) | 56.3 | 90.1 | 31.1 |

*Capacity retention rate (%): Using PEBC0506 from PNEsolution company, charging (0.33 C CC/4.2 V 0.05 C Current-cut CV) with CC/CV, followed by 30 minutes of rest, and discharging with CC (0.33) were repeated three times, and the third discharging capacity was reflected as the capacity.
Capacity retention rate (%) = (capacity at week N)/(initial capacity) × 100
*Resistance increase rate (%): Using PEBC0506 from PNEsolution company, after setting to the discharging capacity standard SOC50, resistance was measured during CC pulse discharging at a current of 2.5 C.
Resistance = (voltage difference before and after discharging pulse)/(current during discharging)
Resistance increase rate (%) = (resistance at week N − initial resistance)/(initial resistance) × 100
*Volume increase rate (%): Using TWD-150DM from TWD-PLS company, after setting to SOC 100 before high temperature storage, the initial volume was measured, and the volume was measured after cooling at room temperature immediately after high temperature storage.
Volume increase rate (%) = (volume at week N − initial volume)/(initial volume) × 100

According to Table 1, it can be seen that the lithium secondary batteries (Examples 1 to 5) in which the phosphoric acid-based additive according to the present disclosure is added to the electrolyte solution not only has a high capacity retention rate even after storage at high temperature, but also has a low resistance increase rate and a low volume increase rate, and thus are remarkably improved in high-temperature stability, as compared to the lithium secondary battery (Comparative Example 1) in which no phosphoric acid-based additive was added to the electrolyte solution.

All simple modifications or changes of the present disclosure belong to the scope of the present disclosure, and the specific protection scope of the present disclosure will be clarified by the appended claims.

The invention claimed is:

1. A non-aqueous electrolyte solution for a lithium secondary battery, comprising:
    a lithium salt;
    an organic solvent; and
    a phosphoric acid-based additive represented by Formula 1:

[Formula 1]

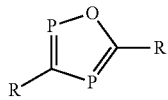

wherein, R is each independently a functional group having a chain or cyclic structure containing at least one element selected from H, C, N, O, F, P, S, or Si.

2. The non-aqueous electrolyte solution for the lithium secondary battery according to claim 1, wherein R is each independently selected from the group consisting of hydrogen, halogen, hydroxy, cyano, nitro, substituted or unsubstituted amino, substituted or unsubstituted mercapto, substituted or unsubstituted carbamoyl, substituted or unsubstituted C$_{1-7}$ alkyl, substituted or unsubstituted C$_{1-7}$ halogenated alkyl, substituted or unsubstituted C$_{2-7}$ alkenyl, substituted or unsubstituted C$_{2-7}$ alkynyl, substituted or unsubstituted C$_{1-7}$ alkoxy, substituted or unsubstituted C$_{1-4}$ alkoxy-C$_{1-4}$ alkoxy, substituted or unsubstituted C$_{6-10}$ aryl-C$_{1-4}$ alkoxy, substituted or unsubstituted C$_{2-7}$ alkenyloxy, substituted or unsubstituted C$_{2-7}$ alkynyloxy, substituted or unsubstituted C$_{3-7}$ cycloalkyl, substituted or unsubstituted C$_{3-7}$ cycloalkenyl, substituted or unsubstituted 3-7 membered heterocycloalkyl, substituted or unsubstituted C$_{3-7}$ cycloalkyloxy, substituted or unsubstituted C$_{3-7}$ cycloalkenyloxy, substituted or unsubstituted 3-7 membered heterocycloalkyloxy, substituted or unsubstituted C$_{6-10}$ aryl, substituted or unsubstituted 5-10 membered heteroaryl, substituted or unsubstituted C$_{6-10}$ aryloxy, substituted or unsubstituted 5-10 membered heteroaryloxy, substituted or unsubstituted mono- or di-C$_{1-4}$ alkylamino, substituted or unsubstituted mono- or di-C$_{6-10}$ arylamino, substituted or unsubstituted C$_{1-4}$ alkylcarbonylamino, substituted or unsubstituted C$_{1-4}$ alkylcarbonyl, substituted or unsubstituted C$_{1-4}$ alkoxycarbonyl, substituted or unsubstituted C$_{2-4}$ alkenyloxycarbonyl, and substituted or unsubstituted C$_{2-4}$ alkynyloxycarbonyl.

3. The non-aqueous electrolyte solution for the lithium secondary battery according to claim 2, wherein R is each independently selected from the group consisting of hydrogen, halogen, hydroxy, cyano, nitro, substituted or unsubstituted amino, substituted or unsubstituted C$_{1-4}$ alkyl, substituted or unsubstituted C$_{1-4}$ halogenated alkyl, substituted or unsubstituted C$_{2-4}$ alkenyl, and substituted or unsubstituted C$_{2-4}$ alkynyl, substituted or unsubstituted C$_{1-4}$ alkoxy, substituted or unsubstituted mono- or di-C$_{1-4}$ alkylamino, substituted or unsubstituted C$_{1-4}$ alkylcarbonyl, and substituted or unsubstituted C$_{1-4}$ alkoxycarbonyl.

4. The non-aqueous electrolyte solution for the lithium secondary battery according to claim 3, wherein R is each independently selected from the group consisting of hydrogen, halogen, substituted or unsubstituted C$_{1-4}$ alkyl, substituted or unsubstituted C$_{1-4}$ halogenated alkyl and substituted or unsubstituted C$_{2-4}$ alkenyl.

5. The non-aqueous electrolyte solution for the lithium secondary battery according to claim 1, wherein the phosphoric acid-based additive is presented in an amount of 0.01% by weight to 10% by weight based on a total weight of the non-aqueous electrolyte solution.

6. The non-aqueous electrolyte solution for the lithium secondary battery according to claim 1, wherein the lithium salt is at least one selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiSO$_3$F, LiN(SO$_2$F)$_2$, LiN(SO$_2$CF$_2$CF$_3$)$_2$, and LiN(SO$_2$CF$_3$)$_2$.

7. The non-aqueous electrolyte solution for the lithium secondary battery according to claim 1, wherein the lithium salt is present in a concentration of 0.1 M to 3 M.

8. The non-aqueous electrolyte solution for the lithium secondary battery according to claim 1, wherein the organic solvent comprises at least one selected from an ether, an ester, an amide, a linear carbonate, or a cyclic carbonate.

9. The non-aqueous electrolyte solution for the lithium secondary battery according to claim 8, wherein the organic solvent comprises a cyclic carbonate and a linear carbonate.

10. The non-aqueous electrolyte solution for the lithium secondary battery according to claim 9, wherein the cyclic carbonate and the linear carbonate are present in a volume ratio of 1:9 to 6:4.

11. A lithium secondary battery, comprising:
    a positive electrode;
    a negative electrode;
    a separator interposed between the positive electrode and the negative electrode; and
    the non-aqueous electrolyte solution according to claim 1.

12. The lithium secondary battery according to claim 11, wherein the positive electrode has a layered structure of a positive electrode active material, wherein the positive electrode active material comprises a lithium complex transition metal oxide having a nickel content of 60 atm % or more, based on all transition metals present in the lithium complex transition metal oxide.

13. The non-aqueous electrolyte solution for the lithium secondary battery according to claim 1, further comprising one or more additional additives selected from lithium difluorooxalatoborate (LiDFOB), lithium bisoxalatoborate (LiB($C_2O_4$)$_2$, LiBOB), lithium tetrafluoroborate (LiBF$_4$), lithium difluorooxalatophosphate (LiDFOP), lithium tetrafluorooxalatophosphate (LiTFOP), lithium difluorophosphate (LiPO$_2$F$_2$), fluoroethylene carbonate (FEC), vinylene carbonate (VC), vinyl ethylene carbonate (VEC), divinyl sulfone, ethylene sulfite, ethylene sulfate, propylene sulfite, diallyl sulfonate, ethane sultone, propane sultone (PS), butane sultone, ethene sultone, butene sultone or propene sultone (PRS).

\* \* \* \* \*